Figure 1:
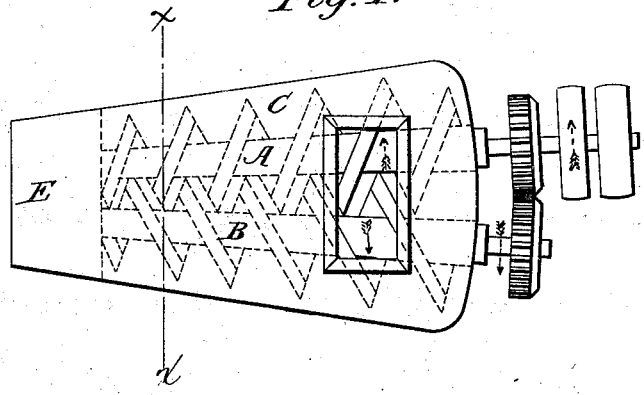

S. L. WIEGAND.
Machines for Sheeting Dough.

No. 155,602.  Patented Oct. 6, 1874.

Witnesses.
John B. Devine
Frank F. Thompson

Inventor:
Lloyd Wiegand

UNITED STATES PATENT OFFICE.

S. LLOYD WIEGAND, OF PHILADELPHIA, PENNSYLVANIA, ASSIGNOR TO D. B. FULLER & CO., OF SAME PLACE.

IMPROVEMENT IN MACHINES FOR SHEETING DOUGH.

Specification forming part of Letters Patent No. 155,602, dated October 6, 1874; application filed April 28, 1874.

*To all whom it may concern:*

Be it known that I, S. LLOYD WIEGAND, of the city and county of Philadelphia and State of Pennsylvania, have invented a new and useful Machine for Sheeting Dough; and I do hereby declare the following to be a full, clear, and exact description thereof, reference being made to the drawing annexed, and the letters of reference marked thereon.

My invention consists of two or more screws having threads or blades of suitable pitch to interlock and rotate in a case or shell and force dough through a flat orifice in the end of the case in the form of a sheet.

Figure 2:
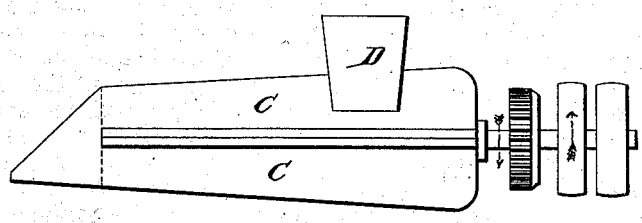
Figure 3:
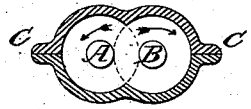
Figure 4:
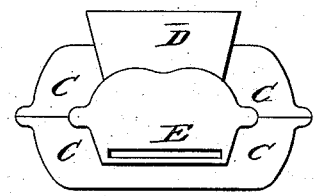

I will now proceed to particularly describe the mode of making and using the said invention, referring to Figure 1, showing a plan; Fig. 2 showing a side elevation; Fig. 3, a transverse section on the line $x\,x$, Fig. 1; and Fig. 4, an end elevation.

The same letters of reference apply to the same parts in the several figures.

A and B represent two screws of equal pitch, A having a right thread, and B a left thread. These screws are, preferably, made conical, although straight screws will answer, and are so placed that their threads interlock, and are surrounded by a shell or case, C, fitting nearly to the outer points of the screw-thread. There is an opening, D, made in the top of the case or shell, through which the dough is introduced. At the end of the case there is a slot, E, made adjustable in width or otherwise.

The operation of the machine is as follows: The dough enters the spiral or helical spaces between the screw-threads, and, were a single screw only used, would rotate with the screw, excepting so far as it is detained by the friction of the portion in contact with the case; but, by using screws made right and left, with the threads of each screw interlocking in the spaces of the other screw, the rotation of the dough is prevented, and the dough is forced lengthwise by the action of the screws toward the slot E in the end of the case, where it is expelled in the form of a sheet, undergoing compression during its passage in the spaces between the screw-threads, in consequence of the tapering form of the screws, gradually diminishing the spaces through which the dough passes in its progress.

I am aware that single screws have been made for kneading and propelling dough in dough-sheeting machines; also, that spur-wheels with interlocking teeth have been applied to such purposes. Both of these, therefore, I distinctly disclaim; but

What I claim as my invention, and desire to secure as such by Letters Patent, is—

The combination of interlocking right and left screws with a case having a slotted aperture, for the purpose of sheeting dough, as set forth and described.

S. LLOYD WIEGAND.

Witnesses:
FRANK F. THOMPSON,
JOHN B. DEVINE.